UNITED STATES PATENT OFFICE.

JOSEPH P. STEIDLE, OF WILKES-BARRE, PENNSYLVANIA.

FLOOR-WAX.

1,389,391.

No Drawing.

Specification of Letters Patent.   Patented Aug. 30, 1921.

Application filed August 4, 1920.   Serial No. 401,221.

*To all whom it may concern:*

Be it known that I, JOSEPH P. STEIDLE, a citizen of the United States, residing at Wilkes-Barre, in the county of Luzerne and State of Pennsylvania, have invented certain new and useful Improvements in Floor-Wax, of which the following is a specification.

This invention relates to a wax powder specially adapted for coating the floors of dance halls and pavilions; and it consists in the novel combination of the ingredients hereinafter fully described and claimed, and in substantially the proportions stated.

The floor wax is preferably composed of the following ingredients:

10 pounds of yellow corn meal,
20 ounces of wax in powder,
2 pounds of paraffin or parawax,
1 pound of powdered borax,
1 pound of boric acid in powder, and
1 pound of powdered soapstone.

The wax is bees wax, or other equivalent wax. The paraffin or parawax is melted by heat, so that it is very fluid, and is then thoroughly mixed with the corn meal. The corn meal is then mixed with all the other powdered ingredients.

The floor wax is preserved in cans, and is sprinkled lightly and evenly in its powdered form on the floor to be treated. The shoes of the dancers who use the floor press the wax upon the floor, and the floor is rendered more suitable for dancing on account of the coating thus applied to it.

What I claim is:

A wax powder for coating dancing floors, comprising substantially 10 pounds of corn meal, 20 ounces of wax, 2 pounds of paraffin or parawax, and one pound each of borax, boric acid and soapstone.

In testimony whereof I have affixed my signature.

JOSEPH P. STEIDLE.